United States Patent [19]

Wank et al.

[11] Patent Number: 4,732,963

[45] Date of Patent: Mar. 22, 1988

[54] THERMOSETTING BIS(ISOIMIDE)-DIPHENOL RESIN

[76] Inventors: Robert L. Wank, 2449 Sommerset Dr., Brea, Calif. 92621; John D. Harper, 5146 Dorado Dr., Huntingdon Beach, Calif. 92649

[21] Appl. No.: 11,696

[22] Filed: Feb. 6, 1987

[51] Int. Cl.$^4$ .................................................. C08G 83/00
[52] U.S. Cl. .................................. 528/205; 528/172; 528/211
[58] Field of Search ................... 528/205, 211, 172

[56] References Cited

U.S. PATENT DOCUMENTS 4,043,986  8/1977  Gruffaz et al. ...................... 528/205
4,275,185  6/1981  Lu ....................................... 528/205

Primary Examiner—Harold D. Anderson
Attorney, Agent, or Firm—Thomas A. Schenach

[57] ABSTRACT

Thermosetting bis(isoimide) resins are prepared by the reaction of an ethylenically unsaturated bis(isoimide) with a dihydric phenol.

6 Claims, No Drawings

THERMOSETTING BIS(ISOIMIDE)-DIPHENOL RESIN

This invention relates to polyimide resins. More particularly, it relates to a new class of thermosetting polymer resins based on bis(isoimides) and having properties different from and advantageous in comparison with conventional polyimides heretofore known.

BACKGROUND OF THE INVENTION

Thermosetting resins based on ethylenically unsaturated N,N-bis-imides

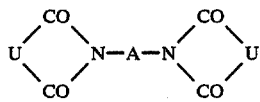

wherein U represents a divalent radical containing a carbon-to-carbon double bond and A represents a divalent radical having at least two carbon atoms are well known in the art. These bis-imides are conventionally prepared by addition of two moles of an anhydride such as maleic anhydride to one mole of an aromatic diamine such as 4,4'-methylene dianiline. The initial reaction product, a bis(maleamic acid)

U(COOH)—CO—NH—A—NH—CO—U(COOH)

is then dehydrated to form the final cyclic N,N-bis-imide. These bis-imides may be converted to polyimide resins by heating, as taught by Grundschober and Sambeth, U.S. Pat. No. 3,380,964. Alternately, they may be coupled with appropriate multifunctional reactants such as diamines having the general formula $H_2N—B—NH_2$, wherein B represents a divalent radical having up to 30 carbon atoms—see for example Bargain and Combet, U.S. Pat. No. Re. 29,316. The exceptional chemical resistance and thermal stability of polyimide resins have found them numerous applications, in for example the manufacture of composites, insulating materials, adhesives, and the like.

Inasmuch as the rate of polymerization of the bis-imides can be controlled by temperature, it is customary in the art to carry out a partial polymerization to form an oligomer or "pre-polymer" which still retains some degree of solubility in selected solvents. Pre-polymer solutions are then used to impregnate fibrous materials such as graphite or glass cloth. These impregnated mixtures are conventionally referred to as "pre-pregs", The solvent is then stripped from the "pre-preg" by means of a drying oven. In the course of this operation, some further polymerization of the pre-polymer occurs, increasing its molecular weight. Finally the "pre-preg" is subjected to higher heat and pressure to complete the polymerization and form the final cured composite article.

Whereas the above process has been used for several years, difficulties do exist. Pre-polymers of conventional bis-imides are soluble only in a few high-boiling solvents such as N-methylpyrrolidone and dimethylformamide. It is extremely difficult to eliminate these solvents completely from the intermediate "pre-preg". If traces of solvent remain, the final cured polymer may contain bubbles, cracks, or other flaws which can render it useless for its intended purpose. This problem is particularly serious with printed circuit boards, an important application for polyimide resins, where flaws cannot be tolerated. Furthermore solutions of pre-polymer in these solvents normally have poor storage stability and must usually be used within twenty four hours of preparation.

SUMMARY OF THE INVENTION

We have now discovered that the problems described hereinabove can be largely avoided by the use of a new and novel class of thermosetting resins which may be partially polymerized, incorporated into "pre-pregs", and cured without the need for the objectionably high boiling solvents required with conventional ethylenically unsaturated bis-imides. The compositions of our invention employ, not the conventional bis-imides, but rather isomers thereof, the ethylenically unsaturated bis(isoimides),

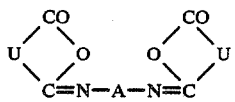

wherein U again represents a divalent radical having a carbon-to-carbon double bond and A represents a divalent radical having at least two carbon atoms. These bis(isoimides), in combination with dihydric phenols, form prepolymers which are readily soluble and stable in low boiling solvents such as acetone or methyl ethyl ketone. Thus "pre-pregs" can be manufactured therefrom from which the solvent can be easily and completely eliminated, thereby minimizing the possibility of bubbles and other flaws in the final cured article. However, once curing is completed, our compositions form resins with the characteristic advantages of the polyimides, including exceptional thermal stability, chemical resistance, and good structural properties.

PRIOR ART

We are not aware of any teaching in the prior art on the use of ethylenically unsaturated bis(isoimides) for the preparation of resins. The synthesis of these compounds is described by Sauers, Cotter, and Whelan, *Journal of the American Chemical Society*, vol. 26(1), p. 10 (1961). However there is no teaching of polymer formation by these workers. Complex aromatic isoimides prepared from the bis(anhydride) of benzophenone tetracarboxylic acid and oxydianiline and terminated by ethynylphenyl groups derived from aminophenylacetylene are known—see Landis and Naselow, *Natl. Sampe Tech. Conf. Ser.* 14, 236 (1982). Resins can be prepared from these compositions by heating. However the chemistry involved is substantially different from that of the ethylenically unsaturated bis(isoimides) of our invention. Dihydric phenols have been used in combination with conventional ethylenically unsaturated bis-imides to form resin products—see for example, German Offenlegungschrift Nos. 2,627,045 and 2,459,925. However a catalyst is required.

DETAILED DESCRIPTION OF THE INVENTION

The same reactants that are used to prepare the ethylenically unsaturated bis-imides of the prior art—for example, maleic anhydride and 4,4'-methylene dianiline—can be used to prepare the bis(isoimides) of our invention. As before, a bis(maleamic acid),

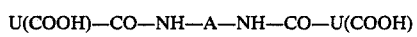

is formed as an intermediate. However, when dehydration of the bis(maleamic acid) is carried out by dicyclohexylcarbodiimide, an extremely mild and specific dehydrating agent, the resulting product is not the conventional bis-imide but rather the bis(isoimide) shown above. Bis(isoimides) differ significantly from their conventional bis-imide counterparts in reactivity. As an illustration, the bis-imides of the prior art may be reacted with an aromatic diamine such as 4,4'-methylene dianiline to form pre-polymers which are soluble in N-methylpyrrolidone or dimethylformamide and can be used in the preparation of "pre-pregs". On the other hand, the bis(isoimides) will react vigorously with the same aromatic diamines to form a highly polymerized resin which is insoluble and therefore cannot be used in the same way to make a "pre-preg".

In the general formula for the bis(isoimides) set out above, the divalent radical U is derived from the ethylenically unsaturated acid anhydride used in the synthesis. Thus, when maleic anhydride is used, U becomes —CH=CH—; when citraconic acid anhydride is used, U is —CH=C(CH₃)—; and so on. U may be part of a cyclic structure—for example, when tetrahydrophthalic anhydride is used, U represents the 1,2-cyclohexene ring. U may contain heteroatoms other than carbon and hydrogen, provided that they do not give undesirable side reactions under our operating conditions—for example, oxygen, nitrogen, sulfur, halogen. U may contain from two to twelve carbon atoms. Maleic anhydride, where U contains two carbon atoms, is an especially preferred starting material.

Likewise, in the general formula, the divalent radical A is derived from the primary diamine, H₂N—A—NH₂, which is reacted with the anhydride to form the bis(isoimide). A may contain from two to thirty carbon atoms and may include cyclic and aromatic structures and heteroatoms other than carbon and hydrogen, such as oxygen, nitrogen, sulfur, and halogen, provided that they do not give undesirable side reactions. Aromatic diamines are preferred starting materials for the bis(isoimides) used in our invention, in which case the radical A becomes

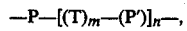
—P—[(T)ₘ—(P')]ₙ—, wherein P and P' are ortho-, meta-, or para-phenylene rings (—C₆H₄—) and substituted derivatives thereof, T represents a bridging group connecting said phenylene rings, such as alkylene, substituted alkylene, oxo (—O—), thio (—S—), sulfo (—SO₂—), carbonyl (—CO—), and the like, m is either zero or one, and n is a number from zero to three. Useful alkylene and substituted alkylene bridging groups include methylene (—CH₂—), ethylidene (—CH(CH₃)—), isopropylidene (—C(CH₃)₂—), bis(trifluoromethyl)methylene (—C(CF₃)₂—), and the like. Especially useful in preparing the bis(isoimides) of our invention are the methylene dianilines, wherein T is —CH₂—, P and P' are both phenylene rings, and m and n are both one.

The dihydric phenols employed in combination with the bis(isoimides) to prepare the thermosetting resins of our invention may be represented by the general formula HO—A'—OH, wherein A' is phenylene and substituted derivatives thereof and may contain from six to thirty carbon atoms. A' may additionally contain heteroatoms such as oxygen, nitrogen, sulfur, and halogen, provided that they do not give undesirable side reactions. Particularly useful in our invention are bis(phenols) represented by the general formula HO—P—(T)ₘ—P'—OH, wherein P,P',T and m have the same meanings as defined above. Suitable dihydric phenols useful in our invention include p,p'-dihydroxydiphenyl sulfone, 4,4'-methylene diphenol (which is commonly known by the trade name "Bisphenol F"), 4,4'-isopropylidene diphenol (commonly known by the trade name "Bisphenol A"), 4,4'-sec-butylidene diphenol (commonly known as "Bisphenol B"), 4,4'-hexafluoroisopropylidene bisphenol, bis(allylphenol), and the tetrabromo derivative of Bisphenol A.

In preparing the thermosetting resin compositions of our invention, the ratio of ethylenically unsaturated bis(isoimide) to dihydric phenol may be varied over a wide range in order to achieve variations in the final resin product. The molar ratio of bis(isoimide) to dihydric phenol should be between 50:1 and 1:1, and is preferably between two and six moles of bis(isoimide) per mole of dihydric phenol. Further modifications in our compositions can be achieved by utilizing mixtures of different bis(isoimides) and by using mixtures of different dihydric phenols in combination therewith. For example, a brominated bisphenol such as the tetrabromo derivative of Bisphenol A may be used in admixture with Bisphenol A to impart an added degree of fire resistance to the final resin product. Such modifications are deemed to be well within the skill of the ordinary worker.

The compositions of our invention are polymerized by the usual methods employed in the art. Partial polymerization to form "pre-polymer" is carried out by heating an intimate mixture of bis(isoimide) and dihydric phenol to melt temperatures and then maintaining the mixture at from about 250° F. to about 350° F. for approximately an hour. Depending on the choice and ratios of the starting bis(isoimide) and dihydric phenol, slight modifications in temperature and time of partial polymerization may be required, as would be obvious to the skilled worker. The melt viscosity of the prepolymer must be sufficiently high that, once a "pre-preg" has been formed and the solvent removed, the prepolymer will not flow away from the glass cloth or fibrous material that has been impregnated therewith at the temperatures normally found in the drying oven (usually about 300° F.). Polymerization is completed by further heating at from about 375° F. to about 500° F., often under pressure, depending on the article being manufactured. The final cured resins are insoluble in solvents and have thermal resistance, structural properties, and glass transition temperatures similar to the conventional polyimide resins of the prior art.

The preparation of the thermosetting bis(isoimide) resins of our invention will now be illustrated by specific examples.

EXAMPLE 1

Preparation of the Bis(Maleisoimide) of 4,4'-Methylene Dianiline

A solution of 1.05 moles of 4,4'-methylene dianiline in methylene chloride was slowly added to a solution of 2.0 moles of maleic anhydride in the same solvent. After stirring at ambient temperature for one hour, the light tan precipitate of the bis(maleamic acid) was separated by filtration, washed with methylene chloride to remove excess diamine, and ovendried. It was then subjected to dehydration with dicyclohexylcarbodiimide according to the procedure of Sauers, Cotter, and Whelan, *Journal of the American Chemical Society*, 26(1), p.

10 (1961) to form the bis(maleisoimide) as a yellow crystalline powder. The infra-red spectrum exhibits characteristic lactone ring absorptions at 1795 and 1680 cm$^{-1}$.

EXAMPLE 2

A mixture of 71.6 grams of the bis(isoimide) of Example 1 and 22.8 grams of Bisphenol A is heated to 350° F. whereupon the mixture melts and dissolves together. The temperature is immediately reduced to 275° F. and held there for thirty minutes to carry out formation of a pre-polymer. After the thirty minutes, the mixture is heated to 330° F. for an additional five minutes to complete the partial polymerization stage. The pre-polymer is then cooled, ground to a powder, and dissolved in acetone to make a solution containing 65% solids. This solution is stable at 75° F. for at least two months.

A portion of this solution is used to manufacture a laminate. Glass cloth (style no. 7628) is impregnated with the solution up to a 42% prepolymer content, and the resulting "pre-preg" dried at 250° F. for thirty minutes. Two plies of "pre-preg" with outer plies of 1-ounce copper foil are heated for one hour at 375° F. and 250 psi in a hydraulic press to form a laminate, which is then subjected to a final curing step by heating in an oven at 440° F. for 4 hours. The resulting cured laminate had a peel strength of 7 to 9 pounds per inch width, which is acceptable in this type of application.

EXAMPLE 3

In this experiment, Bisphenol A was heated to 350° F. with the bis(maleimide) of 4,4'-methylene dianiline. The infra-red spectrum indicated that no reaction had occurred between the bis-imide and the dihydric phenol. This illustrates the substantial difference in reactivity between the bisimides of the prior art and the bis(isoimides) of our invention. (As noted above, the prior art indicates that polymerization can occur between dihydric phenols and bis-imides if a catalyst is used. As shown in Example 2, no catalyst is necessary if bis(isoimides) are used.)

EXAMPLE 4

A mixture of 7.16 grams of the bis(isoimide) of Example 1 and 2.5 grams of p,p'-dihydroxydiphenyl sulfone is heated to 350° F. to melt, and then held at 275° F. for ten minutes, and finally raised to 300° F. for five minutes. The resulting pre-polymer was soluble in acetone at a 65% solids concentration. The pre-polymer was further polymerized at 375° to 445° F. to prepare the final cured resin.

EXAMPLE 5

A mixture of 3.58 grams of bis(isoimide) and 1.17 grams of bis(allylphenol) was partially polymerized by mixing at 280° to 320° F. for 15 minutes. The resulting pre-polymer was soluble in acetone at a 65% solids concentration. Further cure at 375° to 445° F. produced a hard resin.

EXAMPLE 6

A mixture of 7.16 grams of bis(isoimide) and 5.44 grams of tetrabromo-Bisphenol A was partially polymerized by heating at 280° to 320° F. for 20 minutes. The resulting pre-polymer was soluble in acetone at the 65% level. Further polymerization at 375° F. resulted in a hard resin.

As would be obvious to one skilled in the art, departures from and modifications to the Examples shown above are possible without departing from the spirit or scope of our invention. The above Examples are given for purposes of illustration only and are not meant to be limiting within the scope of the following claims.

We claim:

1. A thermosetting polymer resin prepared by the reaction of an ethylenically unsaturated bis(isoimide) having the general structure

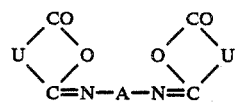

wherein U represents a divalent radical containing a carbon-to-carbon double bond and having from two to twelve carbon atoms, and A represents a divalent radical having from two to thirty carbon atoms, with a dihydric phenol having the general structure

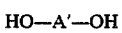

wherein A' represents phenylene or substituted derivatives thereof and contains from six to thirty carbon atoms, the molar ratio of said bis(isoimide) to said dihydric phenol being between 50:1 and 1:1 and the reaction temperature being between about 250° F. to about 500° F.

2. A thermosetting polymer resin according to claim 1 wherein A is derived from an aromatic diamine.

3. A thermosetting polymer resin according to claim 2 wherein the aromatic diamine is selected from the methylene dianilines.

4. A thermosetting polymer resin according to claim 1 wherein the dihydric phenol is selected from bis(-phenols) having the general structure

wherein P and P' are ortho-, meta-, or para-phenylene rings or substituted derivatives thereof, T represents a bridging group connecting said phenylene rings and selected from alkylene, substituted alkylene, oxo, thio, sulfo, or carbonyl, and m is either zero or one.

5. A thermosetting polymer resin according to claim 1 wherein the molar ratio of bis(isoimide) to dihydric phenol is between two and six moles of bis(isoimide) to one mole of dihydric phenol.

6. A thermosetting polymer resin according to claim 1 wherein the bis(isoimide) is the bis(maleisoimide) of 4,4'-methylene dianiline and the dihydric phenol is selected from the group consisting of p,p'-dihydroxydiphenyl sulfone, 4,4'-methylene diphenol, and 4,4'-isopropylidene diphenol.

* * * * *